(12) United States Patent
Jenne et al.

(10) Patent No.: US 9,910,476 B2
(45) Date of Patent: Mar. 6, 2018

(54) SYSTEMS AND METHODS FOR POWER SUPPLY CURRENT SHARE AUTO-TUNING

(71) Applicant: Dell Products L.P., Round Rock, TX (US)

(72) Inventors: John Erven Jenne, Austin, TX (US); Mark A. Muccini, Georgetown, TX (US); Mehran Mirjafari, Austin, TX (US); Lei Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 591 days.

(21) Appl. No.: 14/608,961

(22) Filed: Jan. 29, 2015

(65) Prior Publication Data

US 2016/0224102 A1    Aug. 4, 2016

(51) Int. Cl.
  *G06F 1/32* (2006.01)
  *G06F 1/26* (2006.01)
  *H02J 1/10* (2006.01)
  *H02J 1/00* (2006.01)

(52) U.S. Cl.
  CPC ............ *G06F 1/3206* (2013.01); *G06F 1/263* (2013.01); *G06F 1/3243* (2013.01); *G06F 1/3296* (2013.01); *H02J 1/10* (2013.01); *H02J 1/00* (2013.01)

(58) Field of Classification Search
  USPC ........................................................ 702/65
  See application file for complete search history.

(56) References Cited

U.S. PATENT DOCUMENTS

| | | | | |
|---|---|---|---|---|
| 4,618,779 A | * | 10/1986 | Wiscombe | G05F 1/59 307/60 |
| 5,675,480 A | * | 10/1997 | Stanford | H02M 3/285 307/58 |
| 2003/0155897 A1 | * | 8/2003 | Miftakhutdinov | G06F 1/26 323/282 |
| 2004/0227495 A1 | * | 11/2004 | Egan | G05F 1/618 323/272 |
| 2011/0112700 A1 | * | 5/2011 | Tajima | G06F 1/26 700/293 |
| 2014/0118014 A1 | * | 5/2014 | Orr | G01R 27/16 324/713 |

OTHER PUBLICATIONS

Abu-Qahouq, Jaber A., Analysis and Design of N-Phase Current-Sharing Autotuning Controller, IEEE Transactions on Power Electronics, vol. 25, No. 6, Jun. 2010, pp. 1641-1651.

(Continued)

*Primary Examiner* — Paul D Lee
(74) *Attorney, Agent, or Firm* — Jackson Walker L.L.P.

(57) ABSTRACT

In accordance with embodiments of the present disclosure, a power supply unit may comprise a plurality of output terminals configured to supply electrical energy to one or more information handling resources, a measurement module configured to measure one or more parameters indicative of an intermediate impedance between the power supply unit and at least one other power supply unit, and a microcontroller unit. The microcontroller unit may be configured to estimate an intermediate impedance based on the one or more parameters and communicate the intermediate impedance to a controller of an information handling system in which the power supply unit is disposed.

16 Claims, 7 Drawing Sheets

(56) References Cited

OTHER PUBLICATIONS

Shirazi, Mariko et al., An Autotuning Digital Controller for DC-DC Power Converters Based on Online Frequency-Response Measurement, IEEE Transactions on Power Electronics, vol. 24, No. 11, Nov. 2009, pp. 2578-2588.

Su, J.-T. et al., Auto-tuning Scheme for Improved Current Sharing of Multiphase DC-DC Converters, IET Power Electron, vol. 5, Iss. 9, 2012, pp. 1605-1613.

* cited by examiner

SYSTEMS AND METHODS FOR POWER SUPPLY CURRENT SHARE AUTO-TUNING

TECHNICAL FIELD

The present disclosure relates in general to information handling systems, and more particularly to systems and methods for power supply current share auto-tuning in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a power system including multiple power supply units (PSUs) for supplying electrical energy for use by components of the information handling system. In some instances, the multiple PSUs may be in a redundant configuration to provide redundancy for PSU failures or input failures. Such configurations require a level of load or power sharing between individual PSUs in order to balance thermal, aging, or other effects. To ensure availability and redundancy, a sharing solution may require both load balance accuracy as well as a high degree of stability. Current share control loop accuracy and stability for PSUs may depend highly on an output impedance of individual PSUs as well as an intermediate impedance between PSUs.

A common design approach is to design a current share loop based on a worst case (e.g., lowest) intermediate impedance between PSUs, which may sacrifice current share loop performance (e.g., accuracy, response latency, bandwidth, etc.) when PSUs are operating in a system with intermediate impedance higher than the worst case. In some cases, current share stability and response may be compromised. For these reasons, standard design approaches often require significant qualification efforts for each platform and may require PSU design changes for outliers.

SUMMARY

In accordance with the teachings of the present disclosure, the disadvantages and problems associated with ensuring sharing of current among multiple power supplies in a system may be reduced or eliminated.

In accordance with embodiments of the present disclosure, a power supply unit may comprise a plurality of output terminals configured to supply electrical energy to one or more information handling resources, a measurement module configured to measure one or more parameters indicative of an intermediate impedance between the power supply unit and at least one other power supply unit, and a microcontroller unit. The microcontroller unit may be configured to estimate an intermediate impedance based on the one or more parameters and communicate the intermediate impedance to a controller of an information handling system in which the power supply unit is disposed.

In accordance with these and other embodiments of the present disclosure, a method may include measuring one or more parameters indicative of an intermediate impedance between a first power supply unit and a second power supply unit, calculating an intermediate impedance based on the one or more parameters, and communicating the intermediate impedance to a controller of an information handling system in which the first power supply unit and second power supply unit are disposed.

In accordance with these and other embodiments of the present disclosure, a method may include receiving one or more parameters from a power supply unit and communicating current share control loop parameters to the power supply unit based on the one or more parameters.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
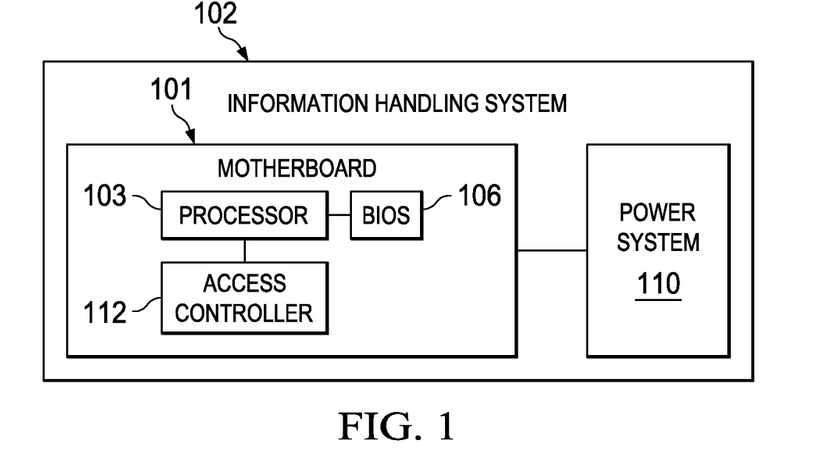
FIG. 1 illustrates a block diagram of an example information handling system, in accordance with embodiments of the present disclosure.

FIG. 1 illustrates a block diagram of an example of an information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer. In yet other embodiments, information handling system 102 may be a mobile device sized and shaped to be readily transported and carried on a person of a user of information handling system 102 (e.g., a smart phone, a tablet computing device, a handheld computing device, a personal digital assistant, etc.).

As shown in FIG. 1, information handling system 102 may include a motherboard 101 and a power system 110.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, a BIOS 106 communicatively coupled to processor 103, and an access controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of a memory and/or another component of information handling system 102.

A BIOS 106 may include any system, device, or apparatus configured to identify, test, and/or initialize information handling resources of an information handling system 102, and/or initialize interoperation of an operating system with information handling resources of information handling system 102. "BIOS" may broadly refer to any system, device, or apparatus configured to perform such functionality, including without limitation, a Unified Extensible Firmware Interface (UEFI). In some embodiments, BIOS 106 may be implemented as a program of instructions that may be read by and executed on processor 103 to carry out the functionality of BIOS 106. In these and other embodiments, BIOS 106 may comprise boot firmware configured to be the first code executed by processor 103 when information handling system 102 is booted and/or powered on. As part of its initialization functionality, code for BIOS 106 may be configured to set components of information handling system 102 into a known state, so that one or more applications (e.g., an operating system or other application programs) stored on compatible media may be executed by processor 103 and given control of information handling system 102. As described in greater detail below, BIOS 106 may also be configured to, in convert with access controller 112, facilitate current load sharing of PSUs 202.

An access controller 112 may be communicatively coupled to processor 103 and may comprise any system, device, or apparatus configured to facilitate management and/or control of components of information handling system 102, information handling systems modularly coupled within, and/or one or more of its component information handling resources. Access controller 112 may be configured to issue commands and/or other signals to manage and/or control information handling resources of information handling system 102. Access controller 112 may comprise a microprocessor, microcontroller, DSP, ASIC, field programmable gate array ("FPGA"), EEPROM, or any combination thereof.

In addition or alternatively, access controller 112 may also provide a management console for user/administrator access to these functions. For example, access controller 112 may provide for communication with a user interface, permitting a user to interact with access controller 112 and configure control and management of components of information handling system 102 by access controller 112. As another example, access controller 112 may implement Web Services Management ("WS-MAN") or another suitable management protocol permitting a user to remotely access an access controller 112 to configure information handling system 102 and its various information handling resources. In such embodiments, access controller 112 may interface with a network interface separate from a traditional network interface of information handling system 102, thus allowing for "out-of-band" control of information handling system 102, such that communications to and from access controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via access controller 112. In the same or alternative embodiments, access controller 112 may allow an administrator to remotely manage one or more parameters associated with operation of information handling system 102 and its various information handling resources (e.g., power usage, processor allocation, memory allocation, security privileges, etc.). In certain embodiments, access controller 112 may include or may be an integral part of a chassis management controller (CMC), a baseboard management controller (BMC), Dell Remote Access Controller (DRAC) or an Integrated Dell Remote Access Controller (iDRAC).

Power system 110 may be electrically coupled to motherboard 101 and/or other information handling resources of information handling system 102. Generally speaking, power system 110 may include any system, device, or apparatus configured to supply electrical current to motherboard 101 and/or other information handling resources of information handling system 102. In some embodiments, power system 110 may include one or more modular PSUs as shown in FIG. 2 and as described in greater detail below.

In addition to motherboard 101, processor 103, BIOS 106, access controller 112, and power system 110, information handling system 102 may include one or more other information handling resources.

Figure 2:
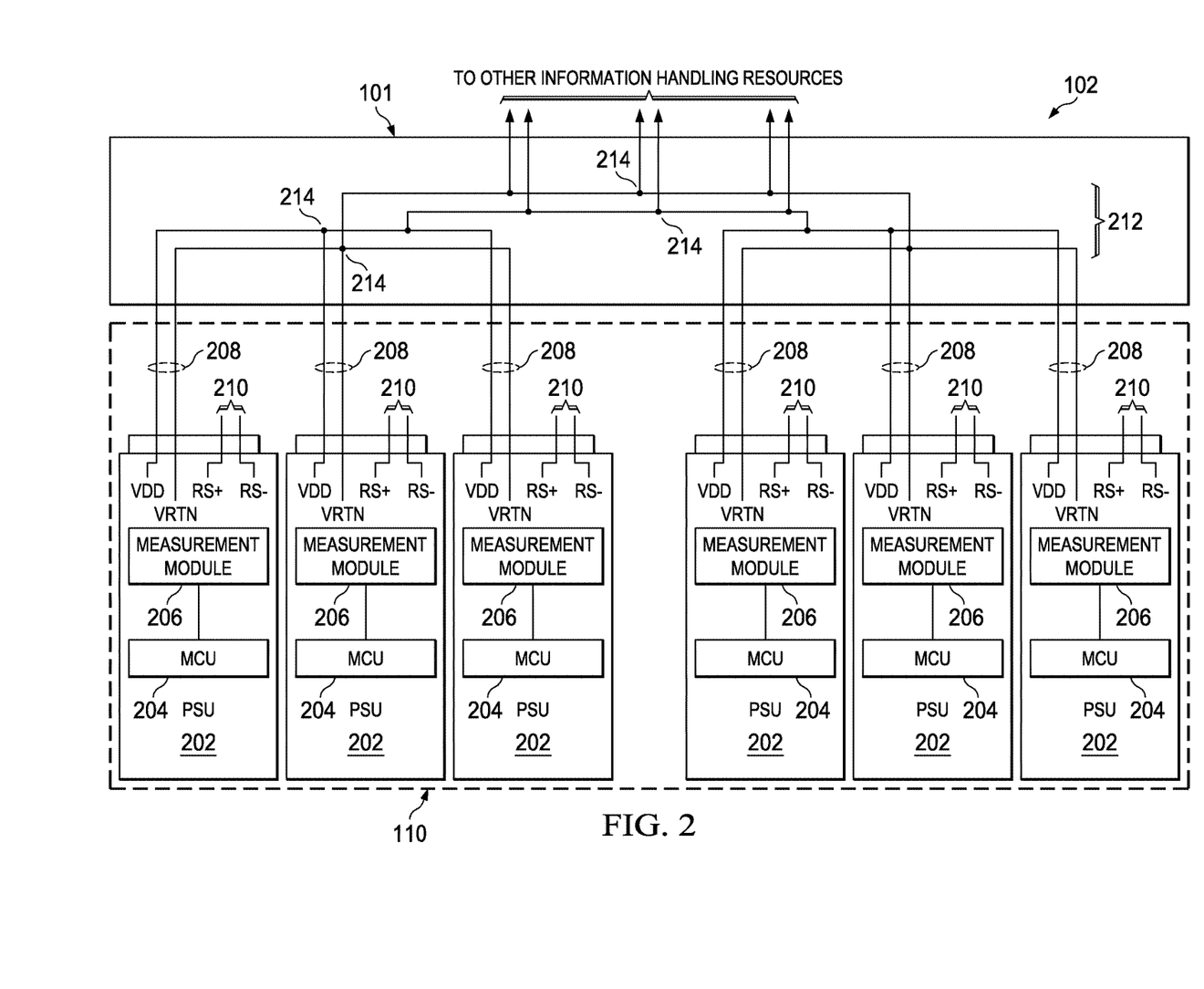
FIG. 2 illustrates a block diagram depicting detail of the information handling system depicted in FIG. 1, in accordance with embodiments of the present disclosure.

FIG. 2 illustrates a block diagram depicting detail of the information handling system 102 depicted in FIG. 1, in accordance with embodiments of the present disclosure. As shown in FIG. 2, power system 110 may include a plurality of PSUs 202. In some embodiments, PSUs 202 may be modular PSUs which are each configured to be readily inserted into and removed from a corresponding slot of information handling system 102.

Each of PSUs 202 may include any device, system, or apparatus operable to supply power or electrical energy to one or more information handling resources. For example, one or more PSUs 202 include any system, device, and/or apparatus operable to supply direct current (DC) electrical power to one or more information handling resources. DC power sources may include a battery and/or an AC/DC adapter that may convert 120- or 240-volt (or any other suitable voltage) alternating current supplied by a utility company to a regulated lower voltage DC power source.

In addition or alternatively, one or more PSUs 202 may include any system, device, and/or apparatus operable to supply AC electrical power directly to one or more information handling resources. In some embodiments, the delivered AC power may subsequently be converted into a DC power source (e.g., using an AC/DC converter).

In some embodiments, one or more of PSUs 202 may include uninterruptible power sources and/or switch mode power sources internal to or externally coupled to information handling resources. In some embodiments, PSUs 202 may be assembled in a redundant configuration within information handling resources (e.g., one or more power sources may be configured to share a load current such that failure of a single power source may not disrupt operation).

As shown in FIG. 2, each PSU 202 may comprise a microcontroller unit (MCU) 204. An MCU 204 may comprise a microprocessor, DSP, ASIC, FPGA, EEPROM, or any combination thereof, or any other device, system, or apparatus for controlling operation of its associated PSU 202. As such, MCU 204 may comprise firmware, logic, and/or data for controlling functionality of such PSU 202. In some embodiments, an MCU 204 may comprise a control loop (e.g., a proportional-integral-differential (PID) controller) for controlling a current delivered by its associated PSU 202 in order to implement current sharing among PSUs 202 disposed in information handling system 102, as described in greater detail below.

As shown in FIG. 2, each PSU 202 may also comprise measurement module 206. An measurement module 206 may be configured to estimate an impedance associated with a PSU 202, including, without limitation, an intermediate impedance between such PSU 202 and another PSU 202.

Each PSU 202 may deliver current to information handling resources of information handling system 102 via power supply outputs 208. Power supply outputs 208 may be electrically coupled to a power bus 212 of motherboard 101. PSUs 202 may also comprise remote sense inputs 210. Remote sense inputs 210 may be configured to be coupled to particular points of motherboard 101 (e.g., sense points 214) in order to facilitate measurement by measurement modules 206, as described in greater detail below.

Power bus 212 may comprise any suitable system for conveying electrical energy generated by PSUs 202 to information handling resources of information handling system 102. For purposes of clarity and exposition, electrical coupling of power bus 212 to information handling resources is not shown.

Figure 3:
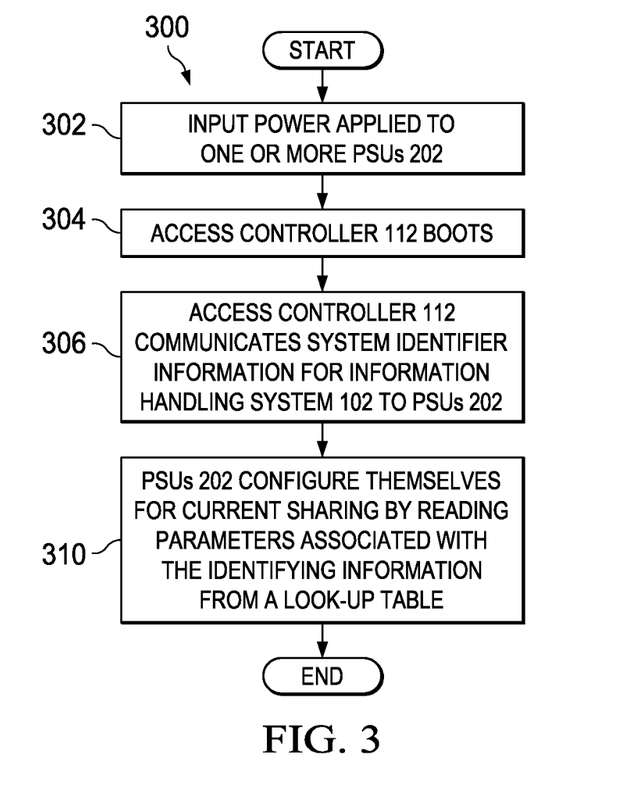
FIG. 3 illustrates a flow chart of an example method for open-loop tuning of PSUs for current sharing, in accordance with embodiments of the present disclosure.

FIG. 3 illustrates a flow chart of an example method 300 for open-loop tuning of PSUs 202 for current sharing, in accordance with embodiments of the present disclosure. According to certain embodiments, method 300 may begin at step 302. As noted above, teachings of the present disclosure may be implemented in a variety of configurations of information handling system 102 as shown in FIGS. 1 and 2. As such, the preferred initialization point for method 300 and the order of the steps comprising method 300 may depend on the implementation chosen.

At step 302, input power may be applied to one or more PSUs 202. At step 304, responsive to power being applied to one or more PSUs 202, access controller 112 may boot. At step 306, after booting, access controller 112 may communicate system identifier information (e.g., via a power management bus) to PSUs 202 disposed in information handling system 102.

At step 310, based on the system identifier information of the information handling system 102, PSUs 202 may configure themselves for current sharing by reading parameters associated with the system identifier information from a look-up table or other store of information stored within the PSUs 202 or otherwise accessible to the PSUs 202. Such parameters may include, without limitation, control coefficients or other parameters related to operation of one or more controllers (e.g., PID controllers implemented by MCUs 204) of the various PSUs 202 for implementing current sharing among installed PSUs 202.

Although FIG. 3 discloses a particular number of steps to be taken with respect to method 300, it may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof or any other system such as those shown in FIGS. 1 and 2 operable to implement method 300. In certain embodiments, method 300 may be implemented partially or fully in software and/or firmware embodied in computer-readable media.

Figure 4A:
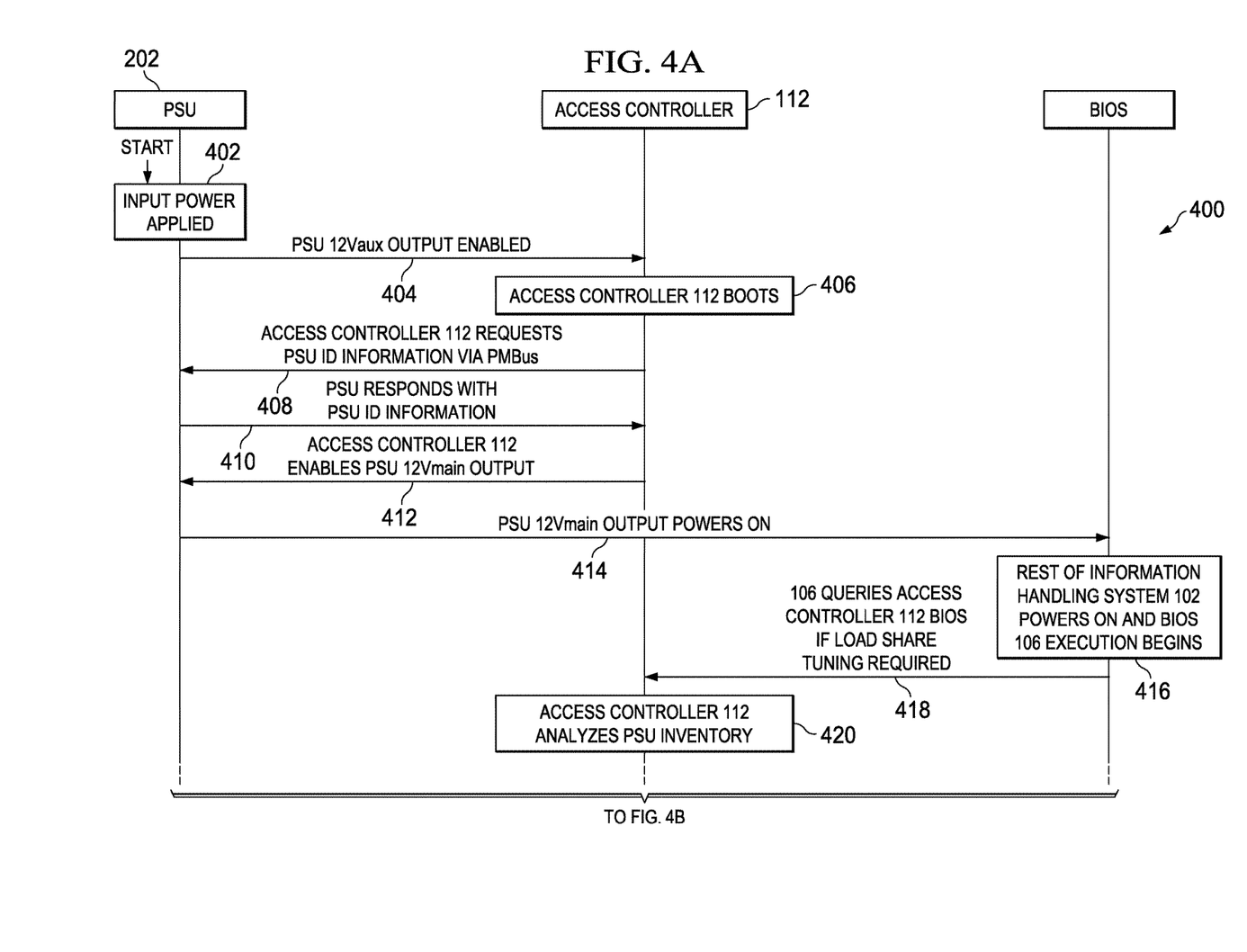
FIGS. 4A and 4B illustrates a flow chart of an example method for auto-tuning of PSUs for current sharing, in accordance with embodiments of the present disclosure.
Figure 4B:
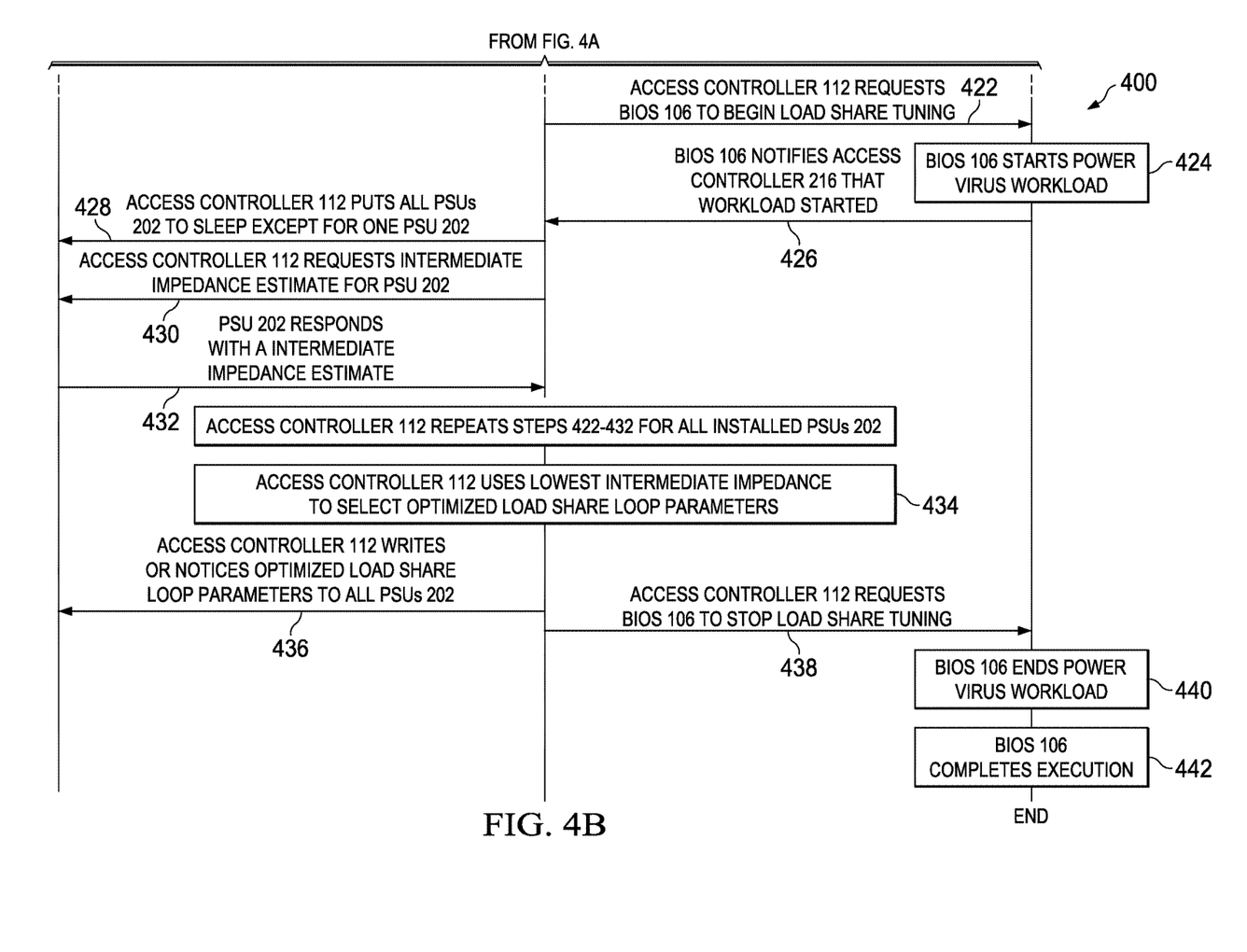

FIGS. 4A and 4B illustrate a flow chart of an example method 400 for auto-tuning of PSUs 202 for current sharing, in accordance with embodiments of the present disclosure. According to certain embodiments, method 400 may begin at step 402. As noted above, teachings of the present disclosure may be implemented in a variety of configurations of information handling system 102 as shown in FIGS. 1 and 2. As such, the preferred initialization point for method 400 and the order of the steps comprising method 400 may depend on the implementation chosen.

At step 402, input power may be applied to one or more PSUs 202, which may, at step 404, enable an auxiliary output of PSUs being powered on. At step 406, responsive to power being applied to one or more PSUs 202, access controller 112 may boot. At step 408, after booting, access controller 112 may communicate a request (e.g., via a power management bus) for identifier information for PSUs 202 disposed in information handling system 102. At step 410, one or more PSUs 202 may communicate identifying information to access controller 112.

At step 412, responsive to receipt of the identifying information of PSUs 202, access controller 112 may enable main power outputs of the PSUs 202. At step 414, the main outputs of PSUs 202 may power on.

At step 416, in response to powering on of main power outputs of PSUs 202, other components of information handling system 102 may power on and execution of BIOS 106 may begin. At step 418, during BIOS execution (e.g., near the end of the power-on self-test of BIOS 106), BIOS 106 may query access controller 112 regarding if load share tuning of PSUs 202 is required.

At step 420, access controller 112 may analyze the inventory of PSUs 202 installed in information handling system 102 to determine if load share tuning is required. At step 422, if load share tuning is required, access controller 112 may communicate to BIOS 106 that load share tuning is required, and in response, at step 424, BIOS 106 may initiate a "power virus" causing information handling resources (e.g., processor 103, memories, etc.) of information handling system 102 to execute a heavy workload, thus causing heavy consumption of power by components of information handling system 102. At step 426, BIOS 106 may communicate to access controller 112 that the power virus workload had begun.

At step 428, access controller 112 may cause all but one PSU 202 to sleep, leaving the single enabled PSU 202 to provide all of the power requirements of the power virus workload. At step 430, access controller 112 may request an intermediate impedance estimation for the enabled PSU 202. At step 432, PSU 202 may estimate its intermediate impedance and communicate such intermediate impedance to access controller 112. Techniques for measuring intermediate impedance are described in greater detail below in reference to FIGS. 5-7. Access controller 112 may cause steps 428 to 432 to repeat for each PSU 202 installed in information handling system 102.

At step 434, access controller 112 or PSUs 202 may, based on the lowest intermediate impedance estimated by the various PSUs 202, determine load share loop parameters to be applied by the load share control loops of the various PSUs 202. At step 436, access controller 112 may communicate these load share parameters to PSUs 202. Alternatively, in other embodiments, PSUs 202 may configure themselves for current sharing by reading parameters associated with the intermediate impedance from a look-up table or other store of information stored within the PSUs 202 or otherwise accessible to the PSUs 202.

At step 438, access controller 112 may request that BIOS 106 stop load share tuning. In response, at step 440, BIOS 106 may end the power virus workload. At step 442, BIOS 106 may continue and complete execution. After completion of step 442, method 400 may end.

Although FIGS. 4A and 4B disclose a particular number of steps to be taken with respect to method 400, it may be executed with greater or lesser steps than those depicted in FIGS. 4A and 4B. In addition, although FIGS. 4A and 4B disclose a certain order of steps to be taken with respect to method 400, the steps comprising method 400 may be completed in any suitable order.

Method 400 may be implemented using information handling system 102, components thereof or any other system such as those shown in FIGS. 1 and 2 operable to implement method 400. In certain embodiments, method 400 may be implemented partially or fully in software and/or firmware embodied in computer-readable media.

Figure 5:
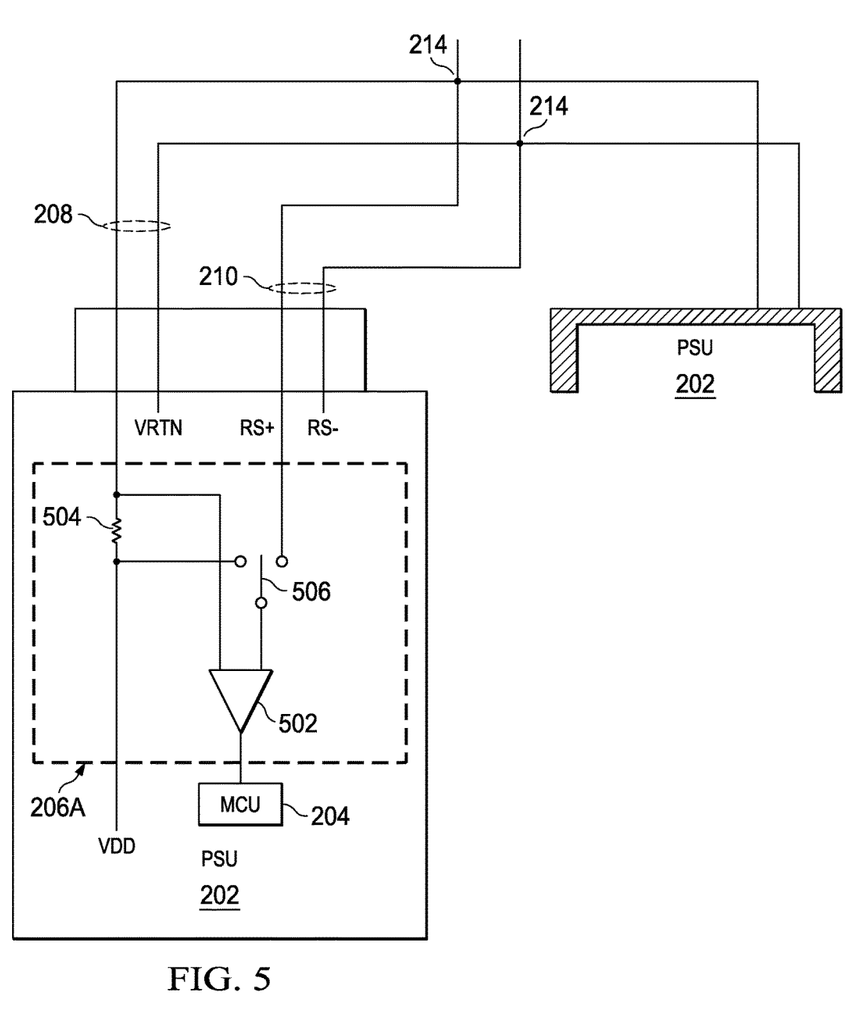
FIG. 5 illustrates a block diagram of selected components of an information handling system with detail of an example measurement module for a PSU, in accordance with embodiments of the present disclosure.

FIG. 5 illustrates a block diagram of selected components of information handling system 102 with detail of a measurement module 206A for a PSU 202, in accordance with embodiments of the present disclosure. As shown in FIG. 5, measurement module 206A may include an operational amplifier 502, a resistor 504 coupled between a supply voltage and a positive output 208 of PSU 202, and a switch 506 coupled at one its terminals to a first terminal of operational amplifier 502. Operational amplifier 502 and/or resistor 504 may comprise part of a legacy current measurement circuit for PSU 202. Resistor 504 may comprise a shunt resistor, printed circuit board trace, OR-ing metal-oxide-semiconductor field-effect transistor, or any other suitable resistive element. Switch 506 may comprise a single-pole double-throw switch or other suitable switch.

In operation, in a first position of switch 506, measurement module 206A may measure a voltage across resistor 504, from which MCU 204 may calculate an output current, based on a known resistance of resistor 504. In a second position of switch 506, switch 506 may couple a sense point 214 to the first terminal of operational amplifier 502, and measurement module 206A may measure a voltage between the positive output 208 of PSU 202 and a sense point 214. Based on the calculated output current with switch 506 in the first position and the measured voltage with switch 506 in the second position, MCU 204 may calculate a resistance between the positive output 208 of PSU 202 and the sense point 214. If sense point 214 is approximately equidistant from two PSUs 202, the intermediate impedance between the two PSUs 202 may be estimated as twice the resistance between the positive output 208 of PSU 202 and the sense point 214. Such estimated intermediate impedance may be used in load share tuning, as described above with respect to method 400.

Figure 6:
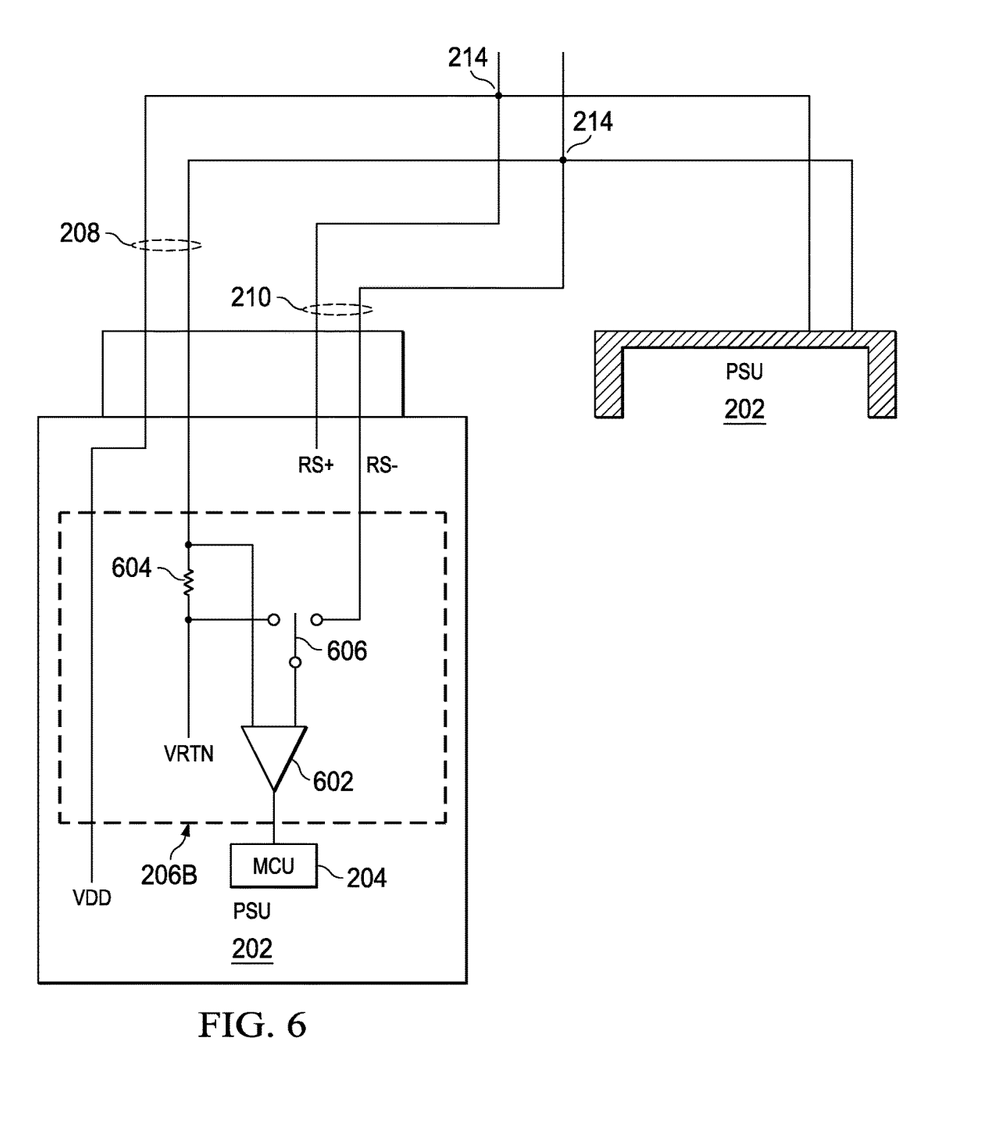
FIG. 6 illustrates a block diagram of selected components of an information handling system with detail of another example measurement module for a PSU, in accordance with embodiments of the present disclosure.

FIG. 6 illustrates a block diagram of selected components of information handling system 102 with detail of another measurement module 206B for a PSU 202, in accordance with embodiments of the present disclosure. As shown in FIG. 6, measurement module 206B may include an operational amplifier 602, a resistor 604 coupled between a return voltage and a negative output 208 of PSU 202, and a switch 606 coupled at one of its terminals to a first terminal of operational amplifier 602. Operational amplifier 602 and/or resistor 604 may comprise part of a legacy current measurement circuit for PSU 202. Resistors 604 may comprise a shunt resistor, printed circuit board trace, OR-ing metal-oxide-semiconductor field-effect transistor, or any other suitable resistive element. Switch 606 may comprise a single-pole double-throw switch or other suitable switch.

In operation, in a first position of switch 606, measurement module 206B may measure a voltage across resistor 604, from which MCU 204 may calculate an output current, based on a known resistance of resistor 604. In a second position of switch 606, switch 606 may couple a sense point 214 to the first terminal of operational amplifier 602, and measurement module 206B may measure a voltage between the negative output 208 of PSU 202 and a sense point 214. Based on the calculated output current with switch 606 in the first position and the measured voltage with switch 606 in the second position, MCU 204 may calculate a resistance between the positive output 208 of PSU 202 and the sense point 214. If sense point 214 is approximately equidistant from two PSUs 202, the intermediate impedance between the two PSUs 202 may be estimated as twice the resistance between the positive output 208 of PSU 202 and the sense point 214. Such estimated intermediate impedance may be used in load share tuning, as described above with respect to method 400.

Figure 7:
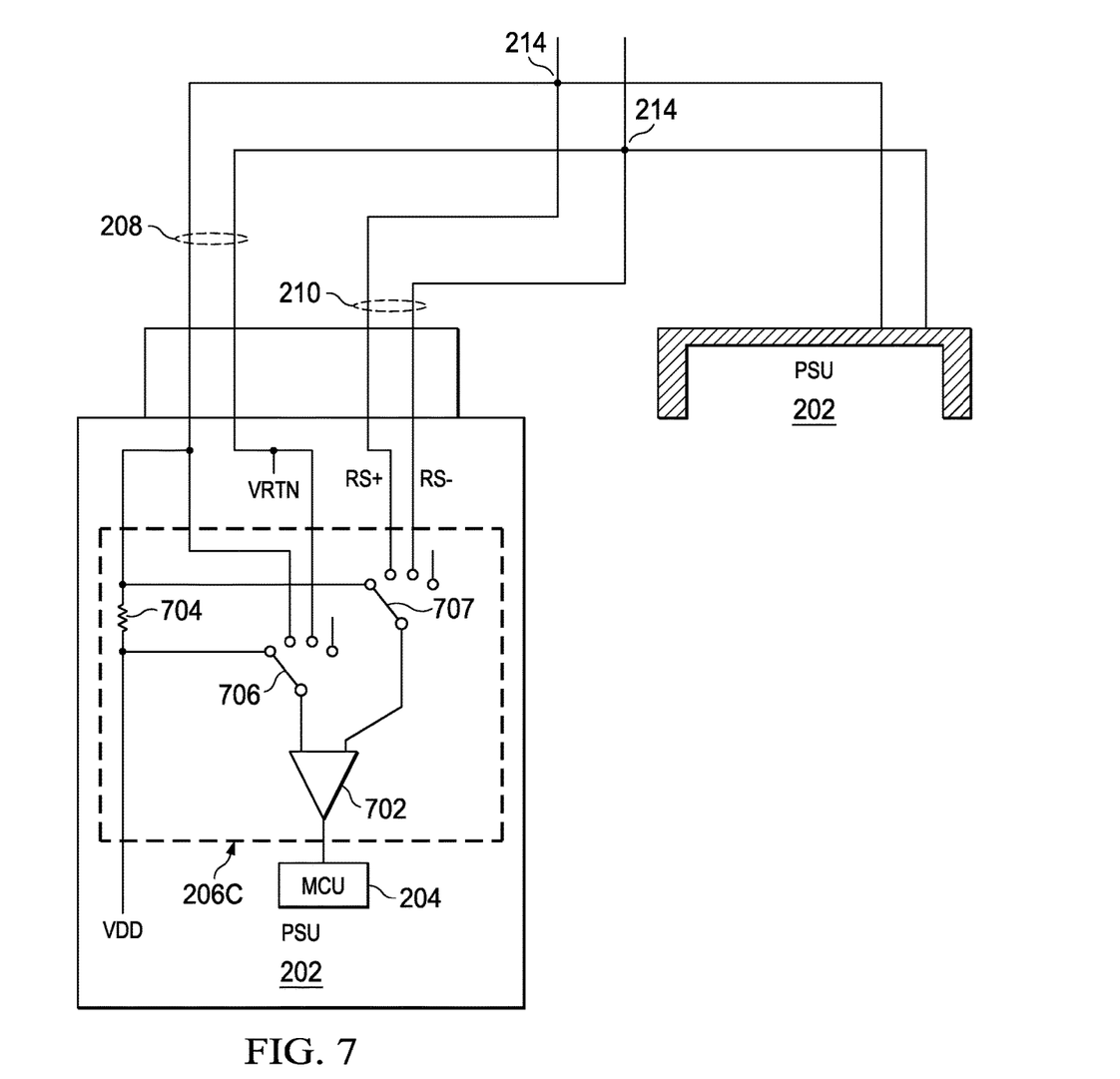
FIG. 7 illustrates a block diagram of selected components of an information handling system with detail of another example measurement module for a PSU, in accordance with embodiments of the present disclosure.

FIG. 7 illustrates a block diagram of selected components of information handling system 102 with detail of another measurement module 206C for a PSU 202, in accordance with embodiments of the present disclosure. As shown in FIG. 7, measurement module 206C may include an operational amplifier 702, a resistor 704 coupled between a source voltage and a positive output 208 of PSU 202, a first switch 706, and a second switch 707 coupled at one terminal to a first terminal of operation amplifier 702. Operational amplifier 702 and/or resistor 704 may comprise part of a legacy current measurement circuit for PSU 202. Resistors 704 may comprise a shunt resistor, printed circuit board trace, OR-ing metal-oxide-semiconductor field-effect transistor, or any other suitable resistive element. Each of switches 706 and 707 may comprise a single-pole triple-throw switch or other suitable switch.

In operation, in a first position of switch 706 and a first position of switch 707, measurement module 206C may measure a voltage across resistor 704, from which MCU 204 may calculate an output current from the positive output terminal 208, based on a known resistance of resistor 704. In a second position of switch 706 and a second position of switch 707, switch 707 may couple a first sense point 214 to the first terminal of operational amplifier 702, and measurement module 206C may measure the voltage between the positive output 208 of PSU 202 and the first sense point 214. Based on the calculated output current with switches 706 and 707 in their first positions and the measured voltage with switches 706 and 707 in their second positions, MCU 204 may calculate a first resistance between the positive output 208 of PSU 202 and the first sense point 214. In a third position of switch 706 and a third position of switch 707, switch 707 may couple a second sense point 214 to the first terminal of operational amplifier 702, and measurement module 206C may measure a voltage between the negative output 208 of PSU 202 and the second sense point 214. Based on the calculated output current with switches 706 and 707 in their first positions and the measured voltage with switches 706 and 707 in their third positions, MCU 204 may calculate a second measured resistance between the negative output 208 of PSU 202 and the second sense point 214. If sense points 214 are approximately equidistant from two PSUs 202, the intermediate impedance between the two PSUs 202 may be estimated by taking the sum of the first resistance between the positive output 208 of PSU 202 and the first sense point 214 and the second resistance between the negative output 208 of PSU 202 and the second sense point 214. Such estimated intermediate impedance may be used in load share tuning, as described above with respect to method 400.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A power supply unit, comprising:
a plurality of output terminals configured to supply electrical energy to one or more information handling resources;
a measurement module configured to measure one or more parameters indicative of an intermediate impedance between the power supply unit and at least one other power supply unit in response to initiation of a power virus by a basic input/output system communicatively coupled to the power supply unit causing the power supply unit to deliver current to information handling resources electrically coupled to the power supply unit; and a microcontroller unit configured to:
  estimate an intermediate impedance based on the one or more parameters; and
  communicate the intermediate impedance to a controller of an information handling system in which the power supply unit is disposed.

2. The power supply unit of claim 1, wherein the controller of the information handling system comprises an access controller.

3. The power supply unit of claim 1, wherein the one or more parameters comprise:
  an output current delivered from a first terminal of the plurality of output terminals; and
  a voltage between the first terminal and a sense point on a power bus electrically coupled to the first terminal; and
  wherein the microcontroller is further configured to calculate an impedance based on the output current and the voltage.

4. The power supply unit of claim 3, wherein the intermediate impedance is based on the impedance.

5. The power supply unit of claim 3, wherein:
  the one or more parameters further comprise a second voltage between a second terminal of the plurality of output terminals and a second sense point on a power bus electrically coupled to the second terminal; and
  the microcontroller is further configured to calculate a second impedance based on the output current and the second voltage.

6. The power supply unit of claim 5, wherein the intermediate impedance is based on the impedance and the second impedance.

7. The power supply unit of claim 1, further wherein the measurement module measures the one or more parameters and the microcontroller unit calculates the intermediate impedance responsive to a request from the controller to perform an estimate of the intermediate impedance.

8. The power supply unit of claim 7, further wherein the microcontroller unit is configured to receive one or more current share loop control parameters based at least on one of:
  the intermediate impedance communicated to the controller; and
  another intermediate impedance associated with another power supply unit.

9. A method comprising:
  measuring one or more parameters indicative of an intermediate impedance between a first power supply unit and a second power supply unit in response to initiation of a power virus by a basic input/output system communicatively coupled to the power supply unit causing the power supply unit to deliver current to information handling resources electrically coupled to the power supply unit;
  calculating an intermediate impedance based on the one or more parameters; and
  communicating the intermediate impedance to a controller of an information handling system in which the first power supply unit and second power supply unit are disposed.

10. The method of claim 9, wherein the controller of the information handling system comprises an access controller.

11. The method of claim 9, wherein the one or more parameters comprise:
  an output current delivered from a first terminal of a plurality of output terminals of the first power supply unit; and
  a voltage between the first terminal and a sense point on a power bus electrically coupled to the first terminal and the second power supply unit; and
  the method further comprises calculating an impedance based on the output current and the voltage.

12. The method of claim 11, wherein the intermediate impedance is based on the impedance.

13. The method of claim 9, wherein:
  the one or more parameters further comprise a second voltage between a second terminal of the plurality of output terminals and a second sense point on a power bus electrically coupled to the second terminal; and
  the method further comprises calculating a second impedance based on the output current and the second voltage.

14. The method of claim 13, wherein the intermediate impedance is based on the impedance and the second impedance.

15. The method of claim 9, further wherein the measuring the one or more parameters and calculating the intermediate impedance is performed responsive to receiving a request from the controller to perform an estimate of the intermediate impedance.

16. The method of claim 15, further comprising receiving one or more current share loop control parameters based at least on one of:
  the intermediate impedance communicated to the controller; and
  another intermediate impedance associated with another power supply unit.

\* \* \* \* \*